No. 710,405. Patented Oct. 7, 1902.
C. A. BARTLIFF.
TANK FOR STORING COMPRESSED HOP AIR.
(Application filed July 20, 1901.)
(No Model.)
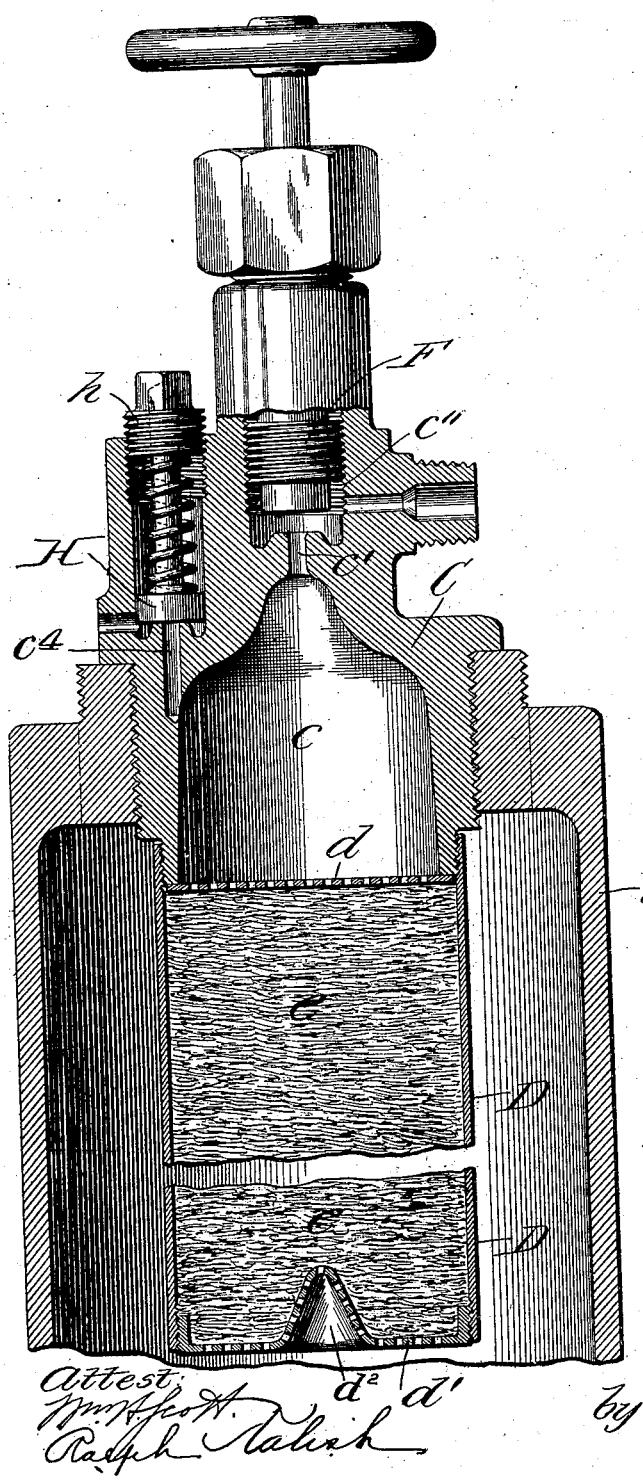
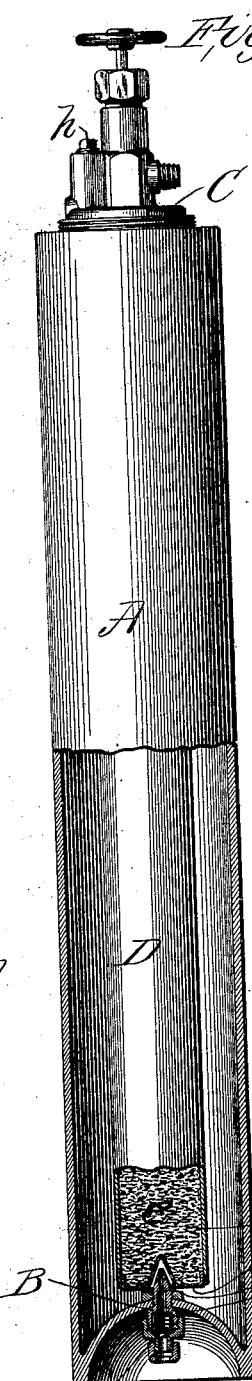
Inventor
Charles A. Bartliff,
by Bakewell & Cornwall
attys.

ic?  # UNITED STATES PATENT OFFICE.

CHARLES A. BARTLIFF, OF ST. LOUIS, MISSOURI.

TANK FOR STORING COMPRESSED HOP-AIR.

SPECIFICATION forming part of Letters Patent No. 710,405, dated October 7, 1902

Application filed July 20, 1901. Serial No. 69,033. (No model.)

*To all whom it may concern:*

Be it known that I, CHARLES A. BARTLIFF, a citizen of the United States, residing at the city of St. Louis, State of Missouri, have invented a certain new and useful Improvement in Tanks for Storing Compressed Hop-Air, of which the following is a full, clear, and exact description, such as will enable others skilled in the art to which it appertains to make and use the same, reference being had to the accompanying drawings, forming part of this specification, in which—

Figure 1 is a vertical sectional view through the upper portion of my improved tank. Fig. 2 is a side elevational view, partly in section, of said tank.

This invention relates to a new and useful improvement in a tank for storing compressed hop-air, being designed particularly for use in connection with a system for compressing and impregnating air with hops used in conjunction with a pressure apparatus employed in forcing malted liquors from a keg shown and described in an application, serially numbered 69,032, filed by me of even date herewith.

In the companion application the system mentioned contemplates a vessel for purifying the air, the purified air being delivered into the bottom of a vessel containing a strong solution of hops, the air rising through the hop solution and being conducted by a pipe into the bottom of the tank shown in the accompanying drawings. The air being treated may be compressed before being introduced into the washing-tank, or the air may be first washed and purified and then compressed and impregnated, or the air may be washed and impregnated and finally compressed before it is introduced into the tank. In any event the tank shown in the accompanying drawings is the receptacle where the air compressed and impregnated with hops is finally stored.

This tank consists of a cylindrical body portion A, the bottom wall of which is slightly arched, said bottom wall carrying a valve-casing B, in which is arranged an inwardly-opening check-valve $b$. The upper end of the tank receives a plug or cap C, whose lower inner end is reduced and threaded to accommodate a pipe D. This pipe contains a perforated plate $d$, which rests against the inner end of the plug, while a perforated plate $d'$ is screwed into the lower end of the pipe, as shown. Between these perforated plates are packed dry hops, (indicated at $e$.) The plug C above the plate $d$ is formed with a chamber $c$, from which leads a duct $c'$ through a threaded boss $c''$. This duct or passage is controlled by a valve F.

$c^4$ indicates a passage leading from the chamber $c$ to the exterior, said passage being controlled by a spring-pressed valve H. This spring-pressed valve H is in the nature of an outwardly-opening check-valve and serves in the capacity of a safety-valve to relieve the tank from excessive pressure. The pressure of the spring against this valve H may be controlled by a plug $h$, whereby it is possible to regulate the sensitiveness of said valve. The plate $d'$ is provided with an indentation or recess $d^2$, into which the valve-plug extends, whereby said plug serves to center the free end of the pipe, and thus support the same in position.

In operation the compressed air containing the solution of hops in suspension is introduced through a valve $b$, occupying the space between the pipe D and the tank A and also the space in the pipe D and the chamber $c$. It will be obvious that all air before reaching chamber $c$ must pass through the dry hops in the pipe D and that as soon as the pressure in chamber $c$ is reduced the pressure is equalized in the tank and the impregnated solution is compelled to pass through the dry hops in the pipe D, and in thus passing through these dry hops the impregnated air absorbs the aroma of the hops, so that in addition to the impregnated air imparting a fine flavor to the beer by reason of the hop solution held in suspension thereby the aroma of the dry hops taken up by the impregnated air through the pipe D imparts a delicious odor to the beer.

I will state that in ordinary practice the pressure of the impregnated air in the tank A when it is first charged is about fifteen hundred pounds and that in being used the valve F is so adjusted that the pressure in the tank is reduced to about ten pounds to the square inch for use on the surface of the beer. Thus it will be seen that the air impregnated with a hop solution passes slowly through the pipe D, and consequently remains a long time in contact with the dry hops contained therein and is thus enabled to absorb the aroma therefrom.

I am aware that many minor changes in the construction, arrangement, and combination of the several parts of my device can be made and substituted for those herein shown and described without in the least departing from the nature and principle of my invention.

Having thus described my invention, what I claim, and desire to obtain by Letters Patent of the United States, is—

1. As a new article of manufacture, a tank for storing impregnated compressed air and the like, the same having a chamber therein, a pipe within said tank and opening at one end into said chamber, a secondary chamber $c$ into which the opposite end of the pipe opens, an inlet-opening into the tank, an outlet-opening from said secondary chamber, and independently-operable valves for controlling said inlet and outlet openings; substantially as described.

2. As a new article of manufacture, a tank for storing impregnated compressed air and the like, the same having a chamber in which is located a pipe opening at one end into said chamber, said pipe at its opposite end opening into a secondary chamber, an inlet-opening into the tank, an inwardly-opening check-valve for controlling said inlet-opening, an outlet-opening from said secondary chamber, and a manually-operable valve for controlling said outlet-opening; substantially as described.

3. As a new article of manufacture, a tank for storing impregnated compressed air and the like, the same consisting of a tank having a chamber therein, a pipe within said tank and opening at one end into said chamber, the opposite end of said pipe opening into a secondary chamber, perforated plates at or near each end of said pipe for providing a chamber in which is contained the impregnating material, an opening leading into the tank, a valve for controlling said inlet-opening, outlet-openings leading from said secondary chamber, a safety-valve for controlling one of said openings, and a manually-operable valve for controlling the other of said openings.

4. In a tank for the purposes described, the combination with a shell A, of an inwardly-opening check-valve $b$, a plug C, a pipe D threaded onto the inner end of said plug, perforated plates $d$ and $d'$ arranged at or near the ends of the pipe D, said plug C being provided with a chamber $c$, from which lead ducts or passages, a valve F for controlling one of said ducts, and spring-pressed valve H for controlling the other of said ducts or passages; substantially as described.

5. In a tank for the purposes described, the combination with a shell, of a pipe arranged therein, perforated plates in the ends of said pipe, and a valve-plug arranged in the bottom of the tank for centering the free end of the pipe; substantially as described.

6. In a tank for the purposes described, the combination with a shell, of a plug arranged in its upper end, a pipe secured to the inner end of said plug and suspended within the tank, perforated plates in each end of the pipe, and a projection on the bottom of the tank received by a recess in the bottom plate for supporting the lower end of the pipe in position; substantially as described.

In testimony whereof I hereunto affix my signature, in the presence of two witnesses, this 18th day of July, 1901.

CHARLES A. BARTLIFF.

Witnesses:
GEORGE BAKEWELL,
RALPH KALISH.